United States Patent [19]

Katakura

[11] 4,119,939
[45] Oct. 10, 1978

[54] ACOUSTIC IMAGING METHOD AND APPARATUS

[75] Inventor: Kageyoshi Katakura, Tokyo, Japan

[73] Assignee: Hitachi Medical Corporation, Japan

[21] Appl. No.: 778,088

[22] Filed: Mar. 16, 1977

[30] Foreign Application Priority Data

Mar. 17, 1976 [JP] Japan .................................. 51-28051

[51] Int. Cl.$^2$ ........................... G01S 9/66; G01S 7/62
[52] U.S. Cl. ................................. 340/1 R; 340/5 MP
[58] Field of Search .............. 340/1 R, 5 MP; 343/7.9

[56] References Cited

U.S. PATENT DOCUMENTS

| | | | |
|---|---|---|---|
| 3,778,757 | 12/1973 | Houston | 340/5 MP |
| 3,919,683 | 11/1975 | Itamura et al. | 340/1 R |
| 4,019,169 | 4/1977 | Takamizawa | 340/1 R |
| 4,023,175 | 5/1977 | Brown et al. | 340/1 R X |

Primary Examiner—Richard A. Farley
Attorney, Agent, or Firm—Craig & Antonelli

[57] ABSTRACT

In acoustic imaging method and apparatus using a plurality of acoustic transducers for transmitting and receiving non-directional acoustic waves, the intensities or magnitudes of the received signals corresponding to the propagation times required for the acoustic waves which are transmitted from the transducers and received thereby after the reflection by a target are superposed in accordance with the position of the target.

6 Claims, 14 Drawing Figures

FIG. 4a
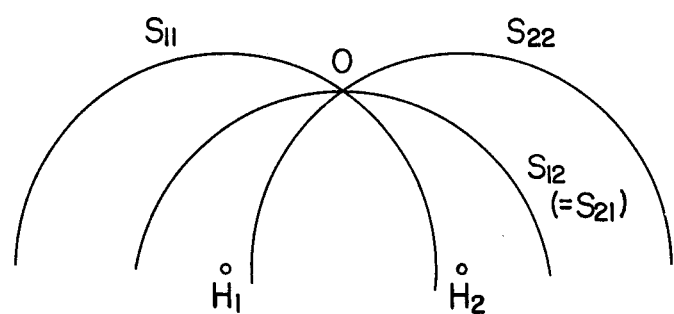
FIG. 4c
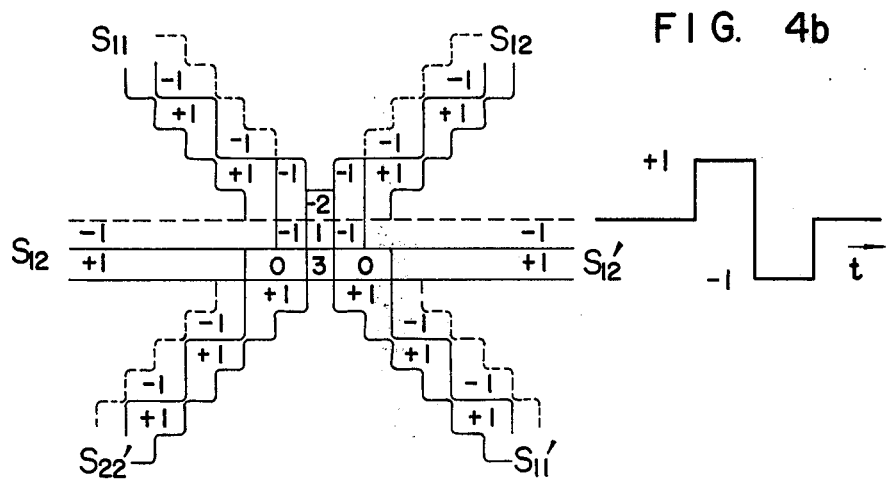
FIG. 4b

4,119,939

ACOUSTIC IMAGING METHOD AND APPARATUS

FIELD OF THE INVENTION

The invention relates to acoustic imaging method and apparatus, and in particular to acoustic imaging method and apparatus for obtaining a tomograph image of a target by transmitting an acoustic wave to the target and receiving the reflected wave or echo from the target.

BRIEF DESCRIPTION OF THE DRAWINGS

FIG. 3b is a waveform diagram to illustrate operation of the apparatus shown in FIG. 3a.

FIGS. 4a to 4c illustrate the operation of the apparatus shown in FIG. 3a.

DESCRIPTION OF THE PRIOR ART

As the practical acoustic imaging apparatus of this kind, there have been hitherto known the apparatus of B-Mode scanning type and sector format scanning type in which an array of acoustic transceivers (or transmitter and receiver transducers) are selectively electrically controlled. However, the acoustic imaging apparatus of the prior art are poor in the resolution.

Figure 1:
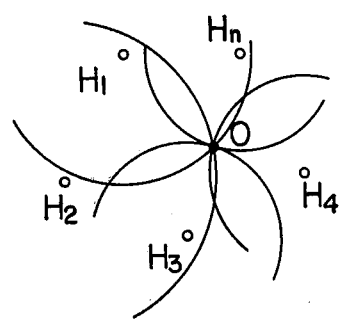
FIG. 1 illustrates the principle of a hitherto known imaging system.

In view of the above fact, the present inventor has already proposed an apparatus having an improved resolution power in which acoustic or ultrasonic waves each having a circular wave front (or of nondirectivity) are sent to a target from different directions and the reflected signals as returned sequentially are then displayed in coaxial circles each having a diameter corresponding to the propagation time of the associated acoustic wave, whereby a tomogram of the target is produced through superposition of the displays in a circular pattern. This proposal was filed under Japanese Patent Application No. 115817/73 and was laid open under Japanese Patent Laid-Open No. 68015/75 on June 7, 1975. FIG. 1 illustrates the principle of such a system. The acoustic wave is emitted from a transceivers $H_1$ and the reflected wave from an object or target $0$ is received by the transceivers $H_1$. In a similar manner, acoustic waves are sequentially emitted from the transceivers $H_2, H_3, \ldots, H_n$ and the corresponding reflected waves from the target $0$ are also sequentially received by these transceivers $H_2, H_3, \ldots, H_n$. The signals obtained from the received reflection waves are displayed on a CRT (Cathode-Ray Tube) or the like in a form of coaxial circles each having a diameter corresponding to the time at which the reflected wave to be displayed is received. Thus, the circles which pass through the target $0$ can be obtained from the outputs of the individual transceivers and the position or location of the target can be determined from the intersection among the displayed circles.

In the above imaging system, the number of the coaxial circular bright lines from which the target position is determined corresponds to that of the transceivers. Under such a circumstance, the ratio between the brightness of the target image reproduced on a display screen and the other portion on the display screen is equal to $1/n$. When the brightness ratio on the order of 40 dB is to be obtained, about one hundred transceivers will be required.

SUMMARY OF THE INVENTION

Accordingly, an object of the invention is to provide acoustic imaging method and apparatus which can exhibit a high resolution with a relatively small number of transceivers.

To that end, the invention is characterized in that non-directional acoustic wave pulses are sequentially transmitted from each of plural transceivers (ultrasonic transducers or vibrators), the reflected waves from a target are sequentially received by the transceiver for each transmitted acoustic wave, and the intensities or magnitudes of the individual received waves are superposed.

DESCRIPTION OF THE PREFERRED EMBODIMENTS

Figure 2:
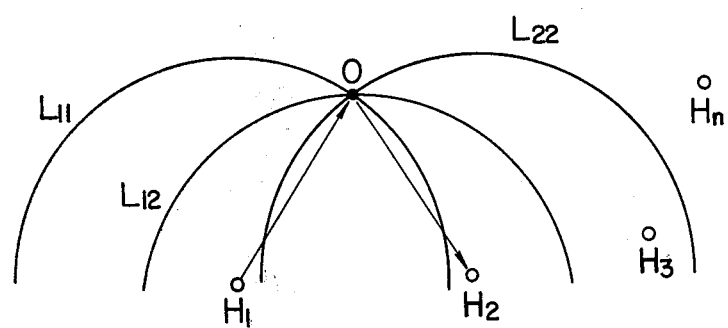
FIG. 2 is a schematic diagram to illustrate the principle of the acoustic imaging system according to the invention.

Referring to FIG. 2 which illustrates the principle of the invention, the acoustic waves (non-directional acoustic waves) transmitted sequentially from a transceiver (or transmitter and receiver transducer) $H_1$ for the number of times corresponding to the number $n$ of the transceivers are reflected by a target $0$. The reflected waves each obtained for the transmission of the associated acoustic wave are sequentially received by the associated transceivers $H_1, H_2, H_3, \ldots, H_n$. In more detail, the reflected wave signal of the acoustic wave transmitted firstly from the transceiver $H_1$ is received by the same transceiver $H_1$, then the reflected wave signal of the acoustic wave transmitted secondly from the transceiver $H_1$ is received by the transceiver $H_2$, the reflected signal of the acoustic wave transmitted thirdly from the transceiver $H_1$ is received by the transceiver $H_3$, and so forth. In this case, the reflected acoustic signals from the target $0$ are received by the transceivers with delays corresponding to acoustic wave propagation times over the paths extending from $H_1$ through $0$ to $H_1, H_2, \ldots, H_n$.

It will be noted that the position of the target $0$ necessarily lies on a circular path $L_{11}$ having a center corresponding to the position of the transceiver $H_1$ and a diameter corresponding to a time interval or delay elapsed before the reflected signal from the target $0$ appears as the received signal from the transceiver $H_1$. Further, the target $0$ which reflects the acoustic wave from the transceiver $H_1$ to be received by the second transceiver $H_2$ with a corresponding time delay will lie on an elliptical track $L_{12}$ having focuses at positions of the transceivers $H_1$ and $H_2$. In a similar manner, the echo signal appearing at the transceiver means that the target $0$ lies on an elliptical track $L_{1n}$.

When the acoustic waves transmitted from the transceiver $H_1$ have been sequentially received by the transceivers $H_1$ to $H_n$, then the acoustic waves from the transceiver $H_2$ as reflected by the target $0$ are successively received by the transceivers $H_1$ to $H_n$. This process is repeated until the signal transmitted from the transceiver $H_n$ and reflected by the target O has been received by the same transceiver $H_n$. In this manner, the acoustic waves are transmitted from each of the transceivers $H_1, H_2, \ldots, H_n$ in the sequential order for $n$ times and the echo signals reflected by the target O are received sequentially by the transceivers $H_1$ to $H_n$ for each transmission.

When the transmission and reception of the acoustic wave is carried out in the above-described manner, $n (n = 1)/2$ circles or ellipsoids are produced through $n$ transceivers. For example, when a relatively small number $n$ of the transceivers (for example, $n = 13$) are employed as many as 91 lines will be produced in a superposed relation so that dynamic range of displayed signal of about 40 dB can be obtained.

Figure 7:
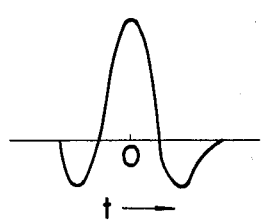
FIG. 7 is a waveform diagram which is helpful to the examination of the resolution.

Next, examination will be made on the resolution of the imaging apparatus according to the invention. In the first place, an ideal directivity characteristic of an acoustic wave source array (composed of $n$ transceivers) having a focusing characteristic is examined in which the acoustic waves focusing or converging on a single point O in a space are transmitted and the reflected waves from the point O are received after the delay time compensation (phasing). In this case, the waveform of the signal $S_{TR}(t)$ as employed has a maximum value at $t = 0$, as is shown in FIG. 7. In other words, Max $[S_{TR}(t)] = S_{TR}(0)$.

Figure 8:
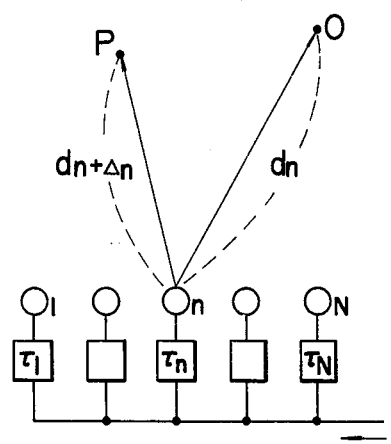
FIGS. 8 to 11 illustrate acoustic wave transmitting and receiving methods according to the invention.

When the signal wave $S_{TR}(t)$ is sent so as to converge on the point O (FIG. 8), the sound pressure $R_P$ at a given point P can be expressed as follows:

$$R_P(t) = \sum_{n=1}^{N} S_{TR}(t - \tau_n - d_n - \Delta_n)$$

Here, $N$ is total number of transceivers, $d_n$ is propagation time from the transceiver $n$ to the point O, $\Delta_n$ is difference between the propagation times from the transceiver $n$ to the points P and O, and $\tau_n$ is delay time required for focusing the acoustic wave onto the point O and selected so that $\tau_n + d_n = K$ where $K$ represents a constant. Thus, $$R_P(t) = \sum_n S(t - K - \Delta_n)$$

Figure 9:
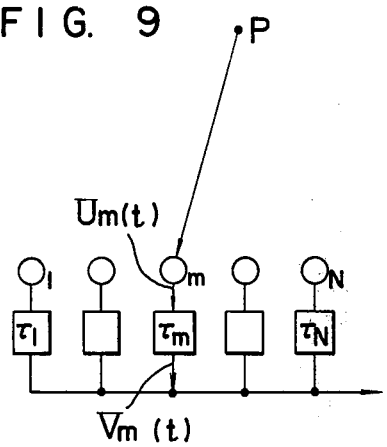

When the reflected signal from the point P subjected to such acoustic irradiation is received by a receiver $m$ shown in FIG. 9, then the output signal $U_m(t)$ therefrom is given by $$U_m(t) = R_P(t - d_m - \Delta_m)$$

Through the same delay compensation processing of the output wave as the transmitted wave, $$V_m(t) = R_P(t - \tau_m - d_m - \tau_m)$$
$$= R_P(t - K - \Delta_m)$$

When these signals are added together for all the outputs of receivers, the receiver output $W(t)$ can be obtained which is given by the following expressions;

$$W(t) = \sum_{m=1}^{N} V_m(t)$$
$$= \sum_{m=1}^{N} R_P(t - K - \Delta_m)$$
$$= \sum_{m=1}^{N} \sum_{n=1}^{N} S_{TR}(t - 2K - \Delta_m - \Delta_n)$$

The maximum value of $W(t)$ is equal to $N^2 S_{TR}(0)$, since Max $[S_{TR}(t)] = S_{TR}(0)$ and makes appearance when $\Delta_m = \Delta_n = 0$ and $t - 2K = 0$. This maximum value corresponds to the receiver output produced when a target is present at the irradiated point. Variation in the receiver output $W_{2K} = W(2K)$ in dependence on $\Delta_m$ and $\Delta_n$ will represent variation or resolution depending on the spatial relationship between the points P and O. The resolution $W_{2K}$ is given by $$W_{2K} = \Sigma\Sigma S_{TR}(-\Delta_m - \Delta_n)$$

Now, discussion will be made on the resolution attained in accordance with the teachings of the invention.

According to the invention, arrangement is made such that the acoustic wave is sent from the $n$-th transceiver and received by the $m$-th transceiver, wherein amplitudes of the received signals $a_{nm}(t)$ at a specific time point are added together on a reproducing or display plane.

Figure 10:
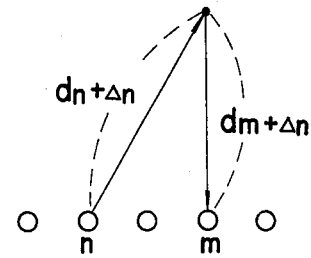

In such a system, the received signal can be given by the following expression, as will be seen from FIG. 10. Namely, $$a_{nm}(t) = S_{TR}(t - d_m - d_n - \Delta_m - \Delta_n)$$

Figure 11:
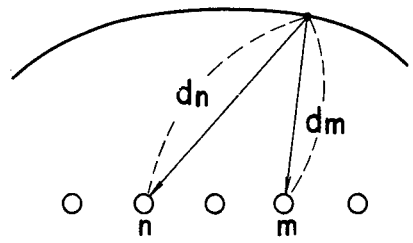

The amplitude of the above signal at the time $t = d_m + d_n$ is recorded as an ellipsoid passing through the point O on the reproducing plane, as is shown in FIG. 11. Accordingly, the reconstructed amplitude $AA_o$ at the specific point O on the reproducing plane is given by the following expression for the combination of $mn$, i.e. combinations of all the transceivers. Namely, $$AA_o = \sum_m \sum_n a_{mn}(d_m + d_n)$$
$$= \sum_{m=1}^{N} \sum_{n=1}^{N} S_{TR}(-\Delta_m - \Delta_n)$$

Variation in the reconstructed amplitude $AA_o$ in dependence on $\Delta_m$ and $\Delta_n$ represents the resolution attained according to the invention. Since the above condition is utterly same as that of $W_{2K}$ described hereinbefore, it will be understood that the system according to the invention can exhibit the same resolution as that of the ideal system having the focusing characteristics in the acoustic wave transmission and reception described hereinbefore. Besides, although the maximum resolution is obtained in the vicinity of the point O because the condition $\tau_n + d_n = K$ has to be fulfilled, the maximum resolution can be obtained in the whole space according to the teachings of the invention, since no restriction is imposed on the parameters $d_m$ and $d_n$.

Figure 3A:
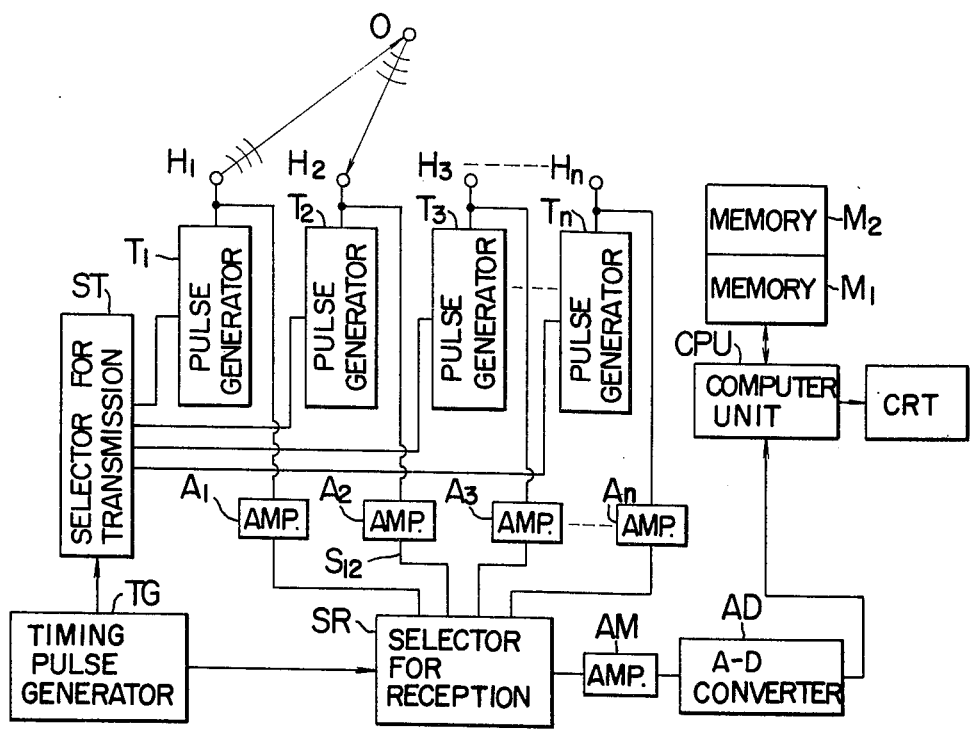
FIG. 3a is a block diagram showing an arrangement of the acoustic imaging apparatus according to an embodiment of the invention.
Figure 3B:
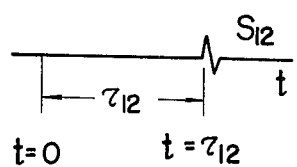

Next, an exemplary embodiment of the apparatus according to the invention will be described by referring to FIGS. 3a to 3b. In FIG. 3a which is a block diagram of the apparatus according to an embodiment of the invention, a timing pulse generator TG produces a pulse signal which is utilized for driving a selector means ST for transmission. A pulse generator $T_1$ selected by the selector ST in turn drives a transceiver $H_1$ thereby to transmit an acoustic wave to a target O, the reflected signal waves therefrom are received by the tranceivers $H_1$ to $H_n$ and amplified by associated amplifiers $A_1$ to $A_n$. The output from the transceiver such as $H_2$ as selected by a selector means SR for reception is then amplified by an amplifier AM to a sufficient magnitude and subjected to a fine sampling operation and digital conversion by an A-D converter AD. The sampled digital signal is then stored in a memory $M_1$ of a computer or processor unit CPU constituted by an electronic computer. The output $S_{12}$ of the transceiver $H_2$ is shown in FIG. 3b. The echo signal from the target O makes appearance at a time $\tau_{12}$ with a time delay due to the acoustic propagation from the transceiver $H_1$ through the target O to the transceiver $H_2$, $t = 0$ representing the time at which the acoustic wave is emitted from the transceiver $H_1$. The operation described above are repeatedly carried out for all the possible combinations of the transceivers $H_1$ to $H_n$ and the echo signals $S_{mn}$ are stored in the memory $M_1$.

Figure 5:
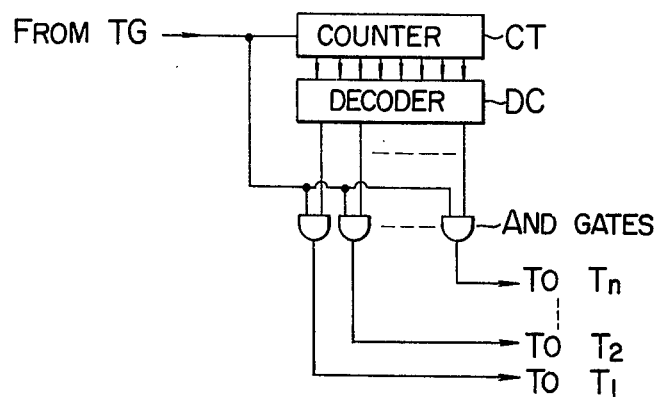
FIGS. 5 and 6 show embodiments of main portions of the apparatus according to the invention.

The selector means ST for transmission is driven by the output pulse from the timing pulse generator TG which is adapted to produce the timing signal at a sufficiently great time interval $\tau_T$ for obtaining the echo signal from the target O located at a considerably remote position for n times corresponding to the number of the tranceivers. An exemplary embodiment of the selector means ST is shown in FIG. 5. The pulse signal from the timing pulse generator TG is input to a counter CT having n positions the outputs from which are applied to a decoder DC in parallel. The outputs from the decoder DC are applied to one inputs of n AND gates. Thus, during the period in which n pulses are produced from the timing pulse generator TG, only the pulse generator $T_1$ is driven so that the acoustic transmission is made from the transceiver $H_1$.

On the other hand, the selector means SR for reception is constituted by a group of analog gates and a circuit for selecting the analog gate and adapted to select out sequentially the received wave signal from the transceivers $H_1$ to $H_n$ in synchronism with the timing pulse generated from the timing pulse generator TG. The analog gate selector circuit may be easily implemented by using shift registers or the like.

When the transmissions and receptions of the acoustic wave have been made n times between the transceiver $H_1$ and the transceivers $H_1$ to $H_n$ by driving the pulse generator $T_1$, then the seconds pulse generator $T_2$ is selected by the selector means ST and driven n times, whereby acoustic transmission and reception will take place between the transceiver $H_2$ and the tranceiver $H_1$ to $H_n$ sequentially under the control of the selector means SR for reception. By repeating the above operation, the signals $S_{mn}$ such as $S_{11} - S_{1n}$, $S_{21} - S_{2n}$ and so forth are all available.

Next, each of the received signals $S_{mn}$ stored in the memory $M_1$ are sequentially read out and stored again in a memory $M_2$ as the image of the target after having been processed by the computer unit CPU. For example, in regard to $S_{12}$, the amplitude of the signal $S_{12}$ is stored in the memory $M_2$ on an ellipsoid having focal points corresponding to the locations of the transceivers $H_1$ and $H_2$, respectively. When the midpoint between the transceivers $H_1$ and $H_2$ is selected as the original, the equation of the above ellipsoid is given as follow:

$$\left(\frac{2x_{12}}{ct}\right)^2 + \frac{4y^2}{(ct)^2 - (d_{12})^2} = 1$$

Here, $d_{12}$ is distance between transceivers $H_1$ and $H_2$, and c is acoustic wave velocity in the imaging plane. The above equation represents an ellipsoid which expands laterally or outwardly as a function of time (and reduced to a circle when $d_{12} = 0$) and the value of the received wave signal $S_{12}$ corresponding to time point t are stored in the memory $M_2$ at a coordinate $(X_{12}, Y_{12})$. When a value of other received wave signal has been stored at the same coordinate, the new value is added to the old one. In this connection, it will be understood that the coordinate computation for determing the coordinate $(X_{12}, Y_{12})$ can be easily executed by an electronic computer since the terms c and $d_{12}$ are known and the values of $S_{12}$ at every sampling time t are stored.

In this manner, when intensities or magnitudes of the received wave or echo signals are stored, the intensities on a circle and an ellipsoid such as shown in FIG. 4a (in this case, two transceivers are employed) will be additively stored in the memory $M_2$. In more detail, in FIG. 4a, $S_{11}$ represents the intensity on a cicle having a center at the position of $H_1$, while $S_{12}$ represents the intensity on an ellipsoid having focal points at the transceivers $H_1$ and $H_2$, and $S_{22}$ represent the intensity or magnitude on a circle having a center at $H_2$. Accordingly, on the assumption that the acoustic waves as sent from the transceiver are constituted by pulses (see FIG. 4b) having amplitude values of $+1$ and $-1$, data shown in FIG. 4c which is resulted from the addition will be written in the memory $M_2$ at the coordinate in the vicinity of the presence position of the target O shown in FIG. 4a. In other words, data of a large value is stored at the coordinate of the target O. In FIG. 4c, data in the direction $S_{11}-S_{11}'$ corresponds to a portion of the circle of intensity $S_{11}$ shown in FIG. 4a (the portion of the circle in the vicinity of the target O), while data in the direction $S_{12}-S_{12}'$ correspond to a portion of the intensity ellipsoid $S_{12}$ shown in FIG. 4a and data in the direction $S_{22}-S_{22}'$ correspond to a portion of the intensity circle $S_{22}$ shown in FIG. 4a.

The display of the stored data may be effected by means of a CRT. However, it will be self-explanatory any other suitable means such as display means provided at the output of a computer may be equally employed.

Figure 6:
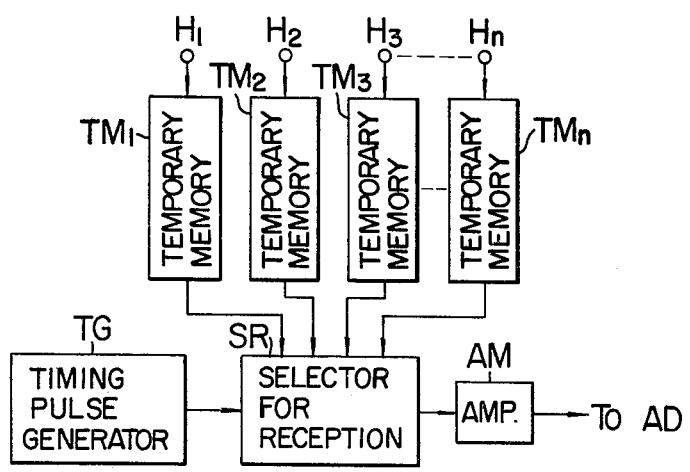

In the foregoing, description has been made on such arrangement that a single tranceiver is operated as a receiver for a single emission of the acoustic wave. However, it is possible to receive the refleeted or echo signal simultaneously by all the transceivers, when temporary memories $TM_1$, $TM_2$, ..., $TM_n$ are provided for the respective transceivers for temporal storage of the received signals therefrom, as is shown in FIG. 6, in which same symbols as those shown in FIG. 3 denote like or equivalent function units. The remaining arrangement of the apparatus shown in FIG. 6 is same as that shown in FIG. 3a.

It will be appreciated from the foregoing description that the disclosed arrangements allows production of a tomograph of a target in a plane containing the transceiver array at a high resolution, while permitting the number of the individual transceivers to be decreased significantly. Further, it is also possible to generate a three-dimensional image by correspondingly providing the memory $M_2$ to correspond to a three-dimensional space and positioning the received signals on rotational ellipsoids having two focal points at the positions of associated transceivers.

Upon the two-dimensional imaging operation, bar-like transmitters each forming a cylindrical wave front or, cylindrical piezo-vibrator elements each having imaginary echo-receiving positions at focal points may be disposed on a two-dimensional plane to be observed. When a three-dimensional imaging is to be effected, miniature type piezo-vibrator elements each producing a spherical wave front or concaved surface vibrator elements may be suitably positioned in a two- or three-dimensional pattern.

In the embodiments described above, it is assumed that a computer is used as the processing unit CPU. However, the coordinate computation may be performed by means of an analog computer or the like with the X- and Y-coordinate signals used for the horizontally and vertically deflecting signals in CRT having a long light remanence characteristic, while the magnitudes of the received signals are utilized as the brightness signal, thereby to provide an additive display on a real-time basis.

I claim:

1. An acoustic imaging method comprising:
   a step of transmitting non-directional pulse-like acoustic waves from a plurality of transmitters to a target;
   a step of storing, in accordance with the target position, the magnitudes of the acoustic wave signals received at time instants determined by propagation times required for the acoustic waves to propagate from said transmitters to the target position and then to a plurality of receivers; and
   a step of repeating said storing step for a predetermined number of times while using a different combination of said transmitters and said receivers, whereby the magnitudes of the received signals are superposed to produce an acoustic image of said target.

2. An acoustic imaging method comprising:
   a step of transmitting to a target a non-directional acoustic wave from one of plural transceivers which operates as a transmitter;
   a step of receiving said acoustic wave by one of said plural transceivers which operates as a receiver;
   a step of storing the received wave signal in accordance with a propagation time of said acoustic wave from the transmission to the reception;
   a step of determining the target position in a spatial coordinate by means of said received wave signal and on the basis of said propagation time and a positional relation between the transceiver as said transmitter and the transceiver as said receiver; and
   a step of repeating said position determining step for the number of times corresponding to the number of said plural transceivers while using a different combination of two of said transceivers for each of said transmitting steps.

3. An acoustic imaging method comprising:
   a step of transmitting to a target a non-directional acoustic wave from one of plural transceivers;
   a step of receiving said acoustic wave by all of said plural transceivers;
   a step of storing the received wave signals in accordance with the respective propagation times;
   a step of determining the target position in a spatial coordinate by means of said received wave signals and on the basis of said propagation times and positional relations between the transceivers used for obtaining said received wave signals; and
   a step of repeating said position determining step for the number of times corresponding to the number of said plural transceivers.

4. An acoustic imaging apparatus comprising:
   a plurality of transceivers;
   first selector means for selecting said transceivers to transmit an acoustic wave therefrom to a target;
   second selector means for selecting said transceivers to receive a reflected acoustic wave from said target;
   first memory means for storing the received wave signal from the transceiver selected by said second selector means;
   operational means for determining, in accordance with contents stored in said first memory means, magnitude of said received wave on a path having a center corresponding to the position of the transceiver selected by said second selector means;
   second memory means for storing an output from said operational means; and
   display means for displaying contents stored in said second memory means.

5. An acoustic imaging apparatus according to claim 4, wherein each of said transceivers is composed of a vibrator element capable of emitting a spherical wave and said second memory means are arranged so as to correspond to a three-dimensional space, whereby a three-dimensional image of said target is produced.

6. An acoustic imaging apparatus according to claim 4, wherein each of said transceivers is provided with third memory means, said second selector means selects simultaneously all of said transceivers for reception of the reflected wave from said target, and the received wave signals are temporarily stored in said third memory means.

* * * * *